United States Patent
Nabeshima (10) Patent No.: US 8,663,444 B2
(45) Date of Patent: Mar. 4, 2014

(54) EQUIPMENT FOR THE PRODUCTION OF REDUCED WATER

(75) Inventor: Takashige Nabeshima, Tokyo (JP)

(73) Assignee: Kuki-Shoukou, Co., Ltd. and Panet Co., Ltd., Tokyo (JP)

( * ) Notice: Subject to any disclaimer, the term of this patent is extended or adjusted under 35 U.S.C. 154(b) by 691 days.

(21) Appl. No.: 12/532,402

(22) PCT Filed: Mar. 23, 2007

(86) PCT No.: PCT/JP2007/056098
§ 371 (c)(1),
(2), (4) Date: Dec. 17, 2009

(87) PCT Pub. No.: WO2008/117387
PCT Pub. Date: Oct. 2, 2008

(65) Prior Publication Data
US 2010/0096270 A1    Apr. 22, 2010

(51) Int. Cl.
C02F 1/461    (2006.01)
C02F 1/00    (2006.01)
C02F 1/48    (2006.01)

(52) U.S. Cl.
USPC ........... 204/660; 204/664; 204/666; 205/742; 205/744; 210/748.01; 210/748.17

(58) Field of Classification Search
USPC ............................. 204/664, 660; 210/748.01, 210/748.16–748.18, 695
See application file for complete search history.

(56) References Cited

U.S. PATENT DOCUMENTS

| 4,810,344 | A | 3/1989 | Okazaki |
| 2002/0036134 | A1* | 3/2002 | Shirota et al. ............... 204/263 |
| 2004/0154993 | A1 | 8/2004 | Yanagihara et al. |
| 2005/0224996 | A1* | 10/2005 | Yoshida ........................... 261/76 |

FOREIGN PATENT DOCUMENTS

| JP | 5-337475 | A | | 12/1993 |
| JP | 2001-179256 | A | | 7/2001 |
| JP | 2003094061 | A | * | 4/2003 |
| JP | 2003-144002 | A | | 5/2003 |

OTHER PUBLICATIONS

Japanse Patent Office, International Search Report for PCT/JP2007/056098, Apr. 10, 2007.
Tatsuo Okazaki, Microfilm of the specification and drawings annexed to the request of Japanese Utility Model Application No. 121396/1985 (Laid-open No. 31993/1987), Feb. 25, 1987.

* cited by examiner

Primary Examiner — Nicholas A Smith
Assistant Examiner — Brian W Cohen
(74) Attorney, Agent, or Firm — Chernoff, Vihauer, McClung & Stenzel, LLP (57) ABSTRACT

Prolongation of the lifetime for reduced water is attempted. Production water that presents alkalinity is produced by utilizing raw water with ionized metallic minerals being dissolved therein and hydrogen gas H2. When inpouring the hydrogen gas together with the raw water into an electromagnetic portion in the apparatus, the hydrogen gas is bubbled and ionized to produce ions. The gas bubbles of the ionized hydrogen-ions are miniaturized. By making a metallic mineral as a core, hydrides (H−), which are negative ions in the hydrogen ions, coordinate on the periphery of that core. The metallic minerals which are complex-ionized (complex-ionized metallic minerals) based on a fact that the hydrides coordinate are dissolved in the water stably for long period of time, so that production water which presents alkalinity, that is, reduced water can be obtained. The reduced water can be utilized as drinking water. A metal container is preferable for a refilling container.

11 Claims, 10 Drawing Sheets

EQUIPMENT FOR THE PRODUCTION OF REDUCED WATER

TECHNICAL FIELD

The present invention relates to a reduced water producing apparatus. In more detail, it relates to an apparatus that may produce massive reduced water in which hytrides (H−) are coordinated with metallic mineral by utilizing hydrogen gas and by electrolyzing raw water including the mineral while mixing that hydrogen gas and the raw water to make gas bubbles.

BACKGROUND ART

It is said with respect to the cells constituting human body tissues that the cell tissues may suffer any damages by receiving influence of any pieces of active oxygen generated in the body. It is also said that the cells are subject to the transfer to a malignant tumor when they are damaged.

For such occasions, these pieces of active oxygen generated in the body can be made harmless by reacting them with any pieces of active hydrogen. If these pieces of active hydrogen can be taken into the body together with water, it is possible to decrease the pieces of active oxygen in the body considerably.

Numerous kinds of techniques for producing water into which pieces of active hydrogen are dissolved have been proposed. Among them, there is a technique which utilizes hydrogen gas. This is a technology in which the hydrogen gas is mixed with the water under high temperature and high pressure, thereby producing reduced water including hydrogen ions by means of decreasing the pressure after the mixture thereof.

DISCLOSURE OF THE INVENTION

Problem to be Solved by the Invention

Meanwhile, the hydrogen ions are dissolved in the reduced water produced by the above-mentioned technology but the hydrogen ions change to water when being exposed to the air (oxygen), so that it is considered that the lifetime of the dissolved hydrogen ions is very short and is probably within several hours.

For this reason, unless the produced reduced water is drunk at once, the effect of the hydrogen ions cannot be expected, so that this would be limited for a specific usage such as the drink at home in which a reduced water producing apparatus and the drinking thereof have direct bearings on each other.

Consequently, in order to distribute the produced reduced water to the market, by packaging it in a plastic container or the like, such as commercially available drinking water, it is preferable if the ion concentration on an occasion of the production (which has high electronic concentration and this corresponds to a low oxidation-reduction potential) can be maintained for several days or more. If possible, it is more preferable in consideration of the distribution channel if the high ion concentration can be maintained at least around one week after the water is handed to the final consumer.

Accordingly, in order to solve such an existing problem, the present invention is to present a reduced water producing apparatus which can produce reduced water having a long lifetime.

Means for Solving the Problem

In order to solve the above-mentioned problem, a reduced water producing apparatus relative to the present invention claimed in claim 1 is characterized by comprising a processing tank for producing reduced water from raw water including a metallic mineral and an electromagnetic water processing apparatus which exists in the processing tank and is located in the water of aforesaid raw water, wherein the aforesaid electromagnetic water processing apparatus includes a water processing unit for producing a hydrogen ion from hydrogen gas mixed to the raw water, wherein this water processing unit is provided with an electromagnetic portion through which the aforesaid raw water and the aforesaid hydrogen gas pass, wherein the hydrogen gas is processed in the aforesaid electromagnetic portion to make gas bubbles and to be ionized and at the same time, complex-ionized metallic mineral in which hydride in the aforesaid hydrogen ion is coordinated with the aforesaid metallic mineral is produced, and wherein reduced water that presents alkalinity is produced by discharging the aforesaid complex-ionized metallic mineral into the aforesaid raw water.

In the present invention, production water (reduced water) that presents alkalinity is produced by utilizing raw water into which ionized metallic mineral is dissolved and hydrogen gas $H_2$. Consequently, underground water or the like is convenient for the raw water.

Hydrogen gas is inpoured, together with the raw water flowing-down at high speed, into the electromagnetic portion constituted as the water processing unit. Owing to a fact that the hydrogen gas passes in the electromagnetic field, the hydrogen gas is bubbled and at the same time, is ionized to produce ions thereof. With respect to the ionized hydrogen ions, the gas bubbles thereof are further miniaturized further at a gas bubble shearing portion on the downstream side of the electromagnetic portion.

Since ionized metallic minerals are dissolved in the raw water, with making each of the metallic minerals as a core, hydrides (H−), which are negative ions among the hydrogen ions, are coordinated at the periphery of the core thereof. Complex-ionization is made owing to a fact that the hydrides coordinate. Owing to a fact that a large amount of the metallic minerals which are complex-ionized (complex-ionized metallic minerals) is dissolved in the water, degree of acidity presents alkalinity. Consequently, the water in the processing tank constitutes production water which presents alkalinity, that is, reduced water.

Oxidation-reduction potential EH of the reduced water indicates −500 mV or less. At the maximum, it is possible to lower the oxidation-reduction potential EH until around −700 to −750 mV. The theoretical value (maximum value) is approximately −840 mV. Electron density pe at that time indicates 11 to 13 and the degree of acidity indicates around pH=9.

Since the complex-ionized metallic minerals can exist in the water stably for a long period of time, the reduced water can be utilized as drinking water by refilling it into a container. A metal container is preferable for the refilling container. This is because the initial oxidation-reduction potential can be maintained stably by shielding electrons included in the reduced water. In case of using the metal container, the initial value of the oxidation-reduction potential of the reduced water is sustainable for around one week, so that it can be put to practical use sufficiently as so-called alkali ion water even if taking any distribution channel into consideration.

Effect of the Invention

According to the present invention, such reduced water is produced as to include complex-ionized metallic minerals which are produced by utilizing the hydrogen ions generated, by utilizing hydrogen gas, when applying electrolysis on it and the ionized metallic mineral included in the raw water.

Thus, since hydrides (H−) among the hydrogen ions can coordinate with the metallic mineral acting as a core at the periphery thereof, it is possible to keep the oxidation-reduction potential of the reduced water stably for a long period of time. Therefore, it is possible to prolong the lifetime of the reduced water considerably, so that days such that sale thereof on the market as drinking water will not matter can be maintained.

BEST MODE FOR CARRYING OUT THE INVENTION

The following will describe an embodiment of a reduced water producing apparatus according to the present invention in detail with reference to the drawings.

For convenience of explanation, a principle of the reduced water producing apparatus according to the present invention will be first explained. In the present invention, water in which raw water including metallic minerals is reduced is produced by using an electromagnetic water processing apparatus. Hydrogen gas is used for the reduction thereof.

Passing the hydrogen gas through magnetic field and electric field with injecting it into water flow of high velocity raw water allows the hydrogen gas to be bubbled. Passing the hydrogen gas which has been bubbled through the magnetic field allows the hydrogen gas bubbles to be further miniaturized. Owing to a fact that the gas bubbles are miniaturized, it becomes easy for the hydrogen gas to be ionized and accordingly, mass hydrogen ions (H+, H−) are produced.

Also, passing it through the electric field allows polarities of the unpaired electrons (referred to as radicals) coupled to the ionized hydrogen atoms and the hydrogen ions to be put in same order. Owing to a fact that the polarities of the radicals are put in same order, it is possible to prolong the lifetime of the radicals.

The metallic minerals (ionized metallic minerals) dissolved in the raw water are discharged out of the water processing apparatus (into the water) together with the hydrogen ions. With respect to the metallic minerals passing through the water processing apparatus and the metallic minerals discharged from the water processing apparatus, the H− (hydrides), which are negative ions, coordinate with each of the metallic minerals as a core at a periphery thereof. When the hydrides coordinate with the metallic mineral, the metallic mineral is metal-complex-ionized.

The metal-complex-ionized metallic minerals (complex-ionized metallic minerals) can be dissolved in the water for a long period of time in their stable states. In this manner, circulating the production water containing the metallic minerals, which have been metal-complex-ionized by coordinating the hydrides, further in this electromagnetic water processing apparatus allows water containing the complex-ionized metallic minerals to voluminously exist in the production water.

Accordingly, the oxidation-reduction potential EH of the production water containing the complex-ionized metallic minerals becomes adequately low. In case of water exposed to the air, the oxidation-reduction potential EH thereof is around 300 mV (millivolts) and on the other hand, when complex-ionized metallic minerals are voluminously contained in the production water, the maximum oxidation-reduction potential EH thereof at that time lowers until around −500 to −750 mV and consequently, the electron density pe thereof at that time is condensed until around −6 to −12 (exponential conversion). The pH thereof at that time becomes 8 to 9. Such alkaline production water will be referred to as reduced water hereinafter.

In this reduced water, a large amount of complex-ionized metallic minerals are dissolved. It is possible for the complex-ionized metallic mineral to exist stably in the water for a long period of time. However, since when this reduced water is exposed to the air (oxygen), the hydrides in the complex-ionized metallic mineral are combined with oxygen to form water, it is possible to dissolve the complex-ionized metallic minerals therein over a considerably long period of time if the produced reduced water can be stored under a state not exposed to the air.

According to an experiment, it is possible to keep the oxidation-reduction potential EH to be −500 mV or less for one week or more by using a container (aluminum container or the like) which can confine electrons, so that the oxidation-reduction potential such that it can be put in (be circulated in) the market sufficiently as drinking water, so-called, alkali ion water may be maintained.

Figure 1:
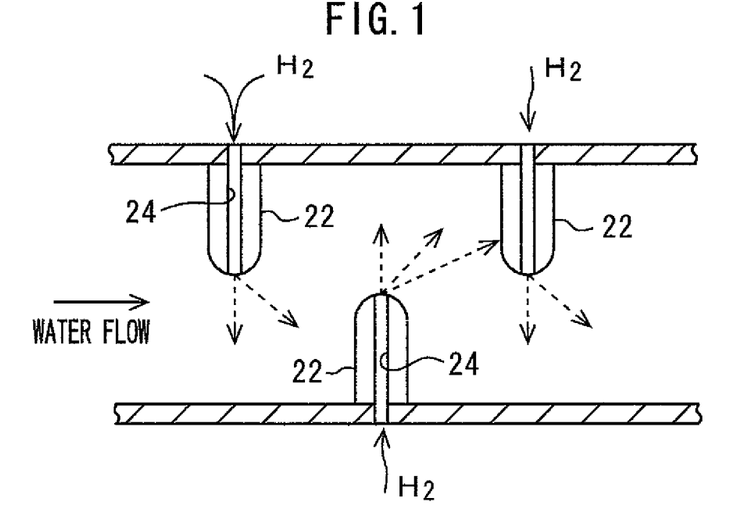
FIG. 1 is an explanatory diagram of gas bubble shearing.

In order to realize the above-mentioned environment, raw water made to be a high velocity water flow is first passed through between bar-shaped fins 22 and 22 which are suction pipes as shown in FIG. 1. The flow velocity in the vicinity of the tip portion of the fin 22 becomes faster than the flow velocity in the vicinity of the central portion thereof, so that the pressure in the vicinity of the fin tip portion becomes negative pressure.

As a result thereof, if there is provided with a guide opening 24 in the fin 22, fluid or gas in the guide opening 24 is sucked closely and is fed into the high velocity water flow. Accordingly, the high velocity water flow (raw water) and the fluid or the gas are mixed, so that gas bubbles can be generated. In this embodiment, hydrogen gas H2 is used for the gas. The hydrogen gas is bubbled while being sucked into the high velocity water flow.

The gas bubbles collide against another fin 22 provided on the downstream side thereof, so that the gas bubbles are broken and a size of each of the gas bubbles comes to be sheared for every collision into ½ or less as compared with the former one. Consequently, if plural fins 22 are arranged in the circumferential direction and two steps or more thereof are arranged with respect to the water flow, it happens that the water flow revolving in the circumferential direction will flow down with repeating collisions against these fins 22 on a number of occasions. For example, by arranging 10 pieces of fins, it is possible to obtain gas bubbles divided into approximately $\frac{1}{1000}$ equally. Consequently, they become gas bubbles of extra super minute grainy (50 μm to namo-meter size) while being sheared.

Figure 2:
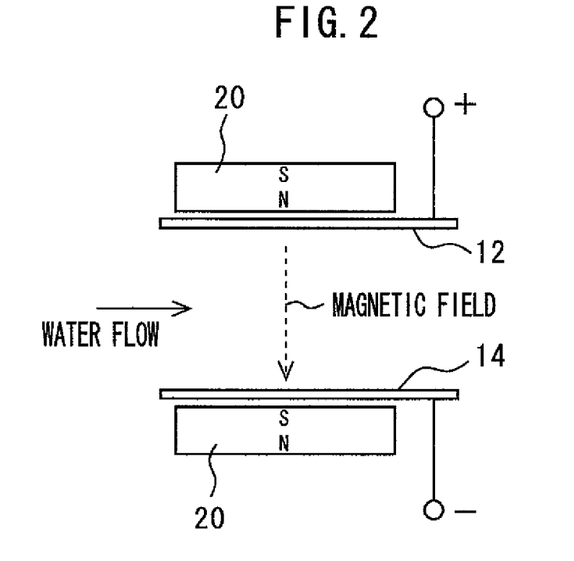
FIG. 2 is an explanatory diagram of an electromagnetic field for explaining a principle of a reduced water producing apparatus according to the present invention.

The gas bubbles are further ionized by passing them through electromagnetic field constituted by electrodes 12, 14 and magnets 20, 20 as shown in FIG. 2. At that time, each of the gas bubbles has a grain diameter of 50 μm to namo-meter size, so that it is very easy for the hydrogen gas to be ionized and furthermore, by passing them through the electric field, they flow down with the polarities of the radicals coupled to the hydrogen ion being put in same order. When the polarities of the radicals are put in same order, it is known, as mentioned above, that the lifetime of the radicals will be prolonged. The gas bubbles are further miniaturized in a gas bubble shearing portion on the downstream side.

Each of the complex-ionized metallic minerals is produced by the hydrides among the hydrogen ions and the metallic mineral included in the raw water. This complex-ionization is performed in a process reaching the gas bubble shearing portion from the electromagnetic portion and a process of being discharged from the gas bubble shearing portion to the inside of the processing tank.

By performing this process, the water in the processing tank becomes production water presenting alkalinity, and by re-supplying this production water to the electromagnetic water processing apparatus together with the raw water so as to be circulated, alkaline production water (reduced water) in which complex-ionized metallic minerals are dissolved voluminously can be obtained. The reduced water is stored in a storage tank and is available for drinking water under a condition of being refilled in individual containers.

This reduced water is suited for a business of the mass-production thereof. For this reason, the volume of the processing tank including the electromagnetic water processing apparatus is relatively large, but it is needless to say that it is possible to design the size so as to fit the application thereof such as for domestic use, for collective housing use and the like.

Figure 3:
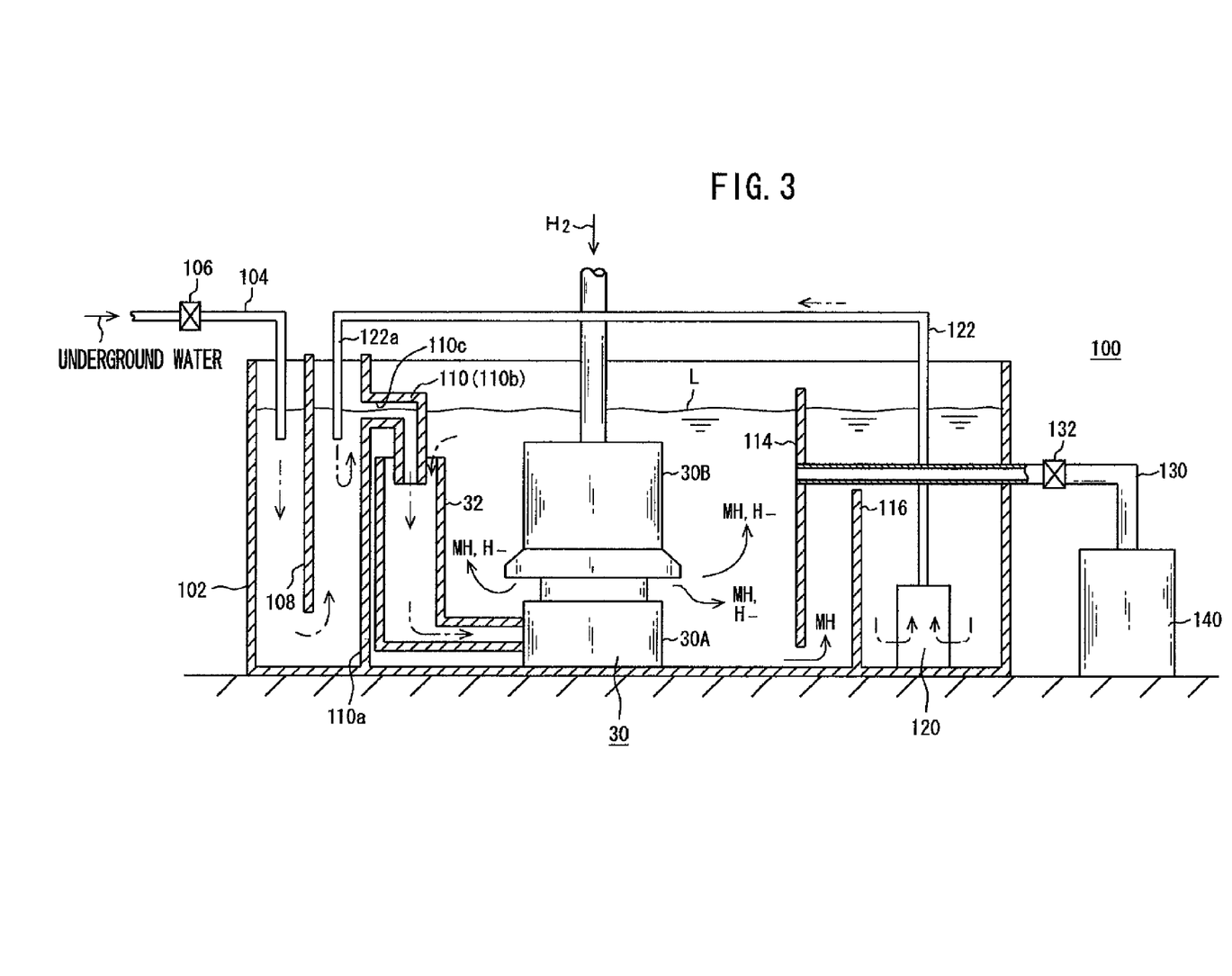
FIG. 3 is an explanatory diagram of a use-state to be used for a fundamental explanation of a reduced water producing apparatus according to the present invention.

The following will describe an embodiment of a reduced water producing apparatus according to the present invention in detail with reference to FIG. 3 and the subsequent figures.

FIG. 3 is a conceptional diagram of this reduced water producing apparatus 100. The reduced water producing apparatus 100 includes a processing tank 102 as shown in this figure. Raw water is supplied into this processing tank 102 through a transport pipe 104. The raw water is transported until reaching a reference water-surface L. The transport of the raw water is adjusted by an opening and closing valve (stop plug) 106.

The processing tank 102 has a building body constituted by a metal material such as stainless, which forms approximately a rectangular shape having a predetermined volume. An electromagnetic water processing apparatus 30 constituting a main portion of the present invention is laid down approximately at the central bottom portion of the processing tank 102 so as to be buried in the water. At approximately an intermediate portion on one end portion of the processing tank 102, in this embodiment, on the wall face side of the right end portion, a water-supply pipe 130 is mounted.

The processing water (reduced water, which will be described later) supplied through the water-supply pipe 130 is guided to a storage tank 140, through an opening and closing valve (stop plug) 132, in which the reduced water is stored. As the storage tank 140, a tank made of metal (in this embodiment, made of aluminum or stainless) which is not exposed to the air and furthermore, which can be shielded electrically from the outside is used.

In order to guide the raw water transported from the transport pipe 104 into the electromagnetic water processing apparatus 30, in this embodiment, a partition plate 108 is mounted and fixed in the vicinity of a faucet of the transport pipe 104 with the bottom portion side thereof being opened.

Also, a guide pipe portion 110 is laid down between a water-guide pipe 32 forming approximately an L-shape which is provided on the electromagnetic water processing apparatus 30 and the partition plate 108. This guide pipe portion 110 is constituted of a bulkhead plate 110a arranged by facing the partition plate 108 with a predetermined distance and a pipe body 110b for guiding the raw water to the water-guide pipe 32.

The bulkhead plate 110a is arranged so as to arrive up to the bottom portion of the building body and it is constituted such that the transported raw water can be guided to a side of the water-guide pipe 32. One end of the pipe body 110b is coupled with a through-hole 110c of the bulkhead plate 110a, the other end thereof is bent in a reversed L-shape and the end portion thereof is gotten into the water-guide pipe 32. Alkaline production water, which will be described later, is supplied into a gap between the partition version 108 and the bulkhead plate 110a from the upper portion of the processing tank 102 through a pipe 122. Such this constitution allows mixed water of the raw water and the ion production water to be supplied to the inside of the electromagnetic water processing apparatus 30.

A pair of partition versions 114, 116 is laid down in the processing tank 102 on the opposite side with respect to the raw water supply side beyond the electromagnetic water processing apparatus 30 so that they can face each other with a predetermined space. Of them, the partition version 114, which is positioned on a side of the electromagnetic water processing apparatus 30, is laid down so as to be raised to a certain degree such that a side thereof can be opened at the bottom portion of the building body and to block the reference water-surface L. On the other hand, the other partition version 116 is laid down from the bottom portion of the building body and a plate body which is made to be shorter from the reference water-surface L by a predetermined length is used therefor.

A submerged pump 120 is laid down in the water partitioned by this short partition version 116 and the side wall of the processing tank 102, and the guide pipe 122 of the submerged pump 120 is laid down so as to reach a side of the above-mentioned partition version 108. The submerged pump 120 is provided for circulating the production water in the processing tank 102 and the production water is returned to a water intake side (into the water-guide pipe 32) of the electromagnetic water processing apparatus 30 by utilizing the submerged pump 120 and the pipe 122.

Namely, the production water is circulated in order to return the alkaline production water produced by the electromagnetic water processing apparatus 30 to the raw water supply side and to produce alkaline production water having a high electron density pe. The alkaline production water having a high electron density pe is discharged to the bottom portion side of the processing tank 102, so that it is constituted that the pair of partition versions 114, 116 can be provided so as to circulate the alkaline production water having a high electron density pe as much as possible to the raw water side by the submerged pump 120 and to supply the production water on the bottom portion side of the processing tank 102 to the submerged pump 120.

Consequently, depending on circumstances, the partition version 116 provided on the side of the submerged pump 120 may be omitted. Also, it is preferable for the submerged pump 120 to be located at the bottom portion of the processing tank 102 as shown in the figure such that the alkaline production water having a high electron density pe can be circulated.

The alkaline production water (reduced water) having a high electron density pe is stored in the storage tank 140 through a pipe 130 whose tip is coupled to a side of the partition plate 114. In this embodiment, for the purpose of enabling light water to be stored, the tip of the pipe 130 is coupled to an upper portion side of the partition 114 than an intermediate portion thereof such that water intake can be carried out from the vicinity of the reference water-surface L as much as possible.

The storing timing is timing when the oxidation-reduction potential of the production water is lowered to a predetermined value or less in which the storing is executed by opening the opening and closing valve 132.

The electromagnetic water processing apparatus 30 located in the processing tank 102 is supplied with mixed water in which the raw water and the alkaline production water are mixed (hereinafter, referred to merely as raw water) through the water-guide pipe 32. For this reason, this electromagnetic water processing apparatus 30 is constituted of a transport pump 30A for the raw water and a water processing unit 30B which is positioned at the upper portion of the transport pump 30A and produces reduced water by processing the fed raw water, and the water processing unit 30B is supplied with hydrogen gas H2 together with the raw water.

In the water processing unit 30B, the hydrogen gas mixed in the raw water is bubbled, the bubbled hydrogen gas is ionized by the electric field and then, hydrogen ions (H+, H−) oriented by the electromagnetic field are produced and at the same time, the metallic mineral dissolved in the raw water acts to produce complex ions in which the metallic mineral is made to be a core.

By operating the electromagnetic water processing apparatus 30 continuously, these metallic minerals which are complex-ionized (complex-ionized metallic mineral) are mass-produced. The complex-ionized metallic minerals are produced in a process of the discharge from the inside of the water processing unit 30B into the water. It seems that the production thereof is carried out to a certain degree even in the water.

By continuing such water processing for a predetermined period of time, the concentration of the production water including these complex-ionized metallic minerals becomes dense, so that the production water including the complex-ionized metallic minerals becomes reduced water which presents alkalinity and its oxidation-reduction potential EH is low and consequently, its electron density pe is high.

It should be noted in this embodiment that the production water having the oxidation-reduction potential EH of −500 mV (consequently, the electron density thereof is around −7 to 8) and degree of acidity of pH=8 or more is referred to as reduced water. Incidentally, drinking water sold with being packaged in a container such as a PET bottle has oxidation-reduction potential EH of around 200 mV (around 3 to 4 when converting by electron density) and the degree of acidity thereof is neutral (around pH=7). Even for an ion water maker used as domestic use, the oxidation-reduction potential EH just after the water is made is around −400 mV at the maximum.

Figure 4:
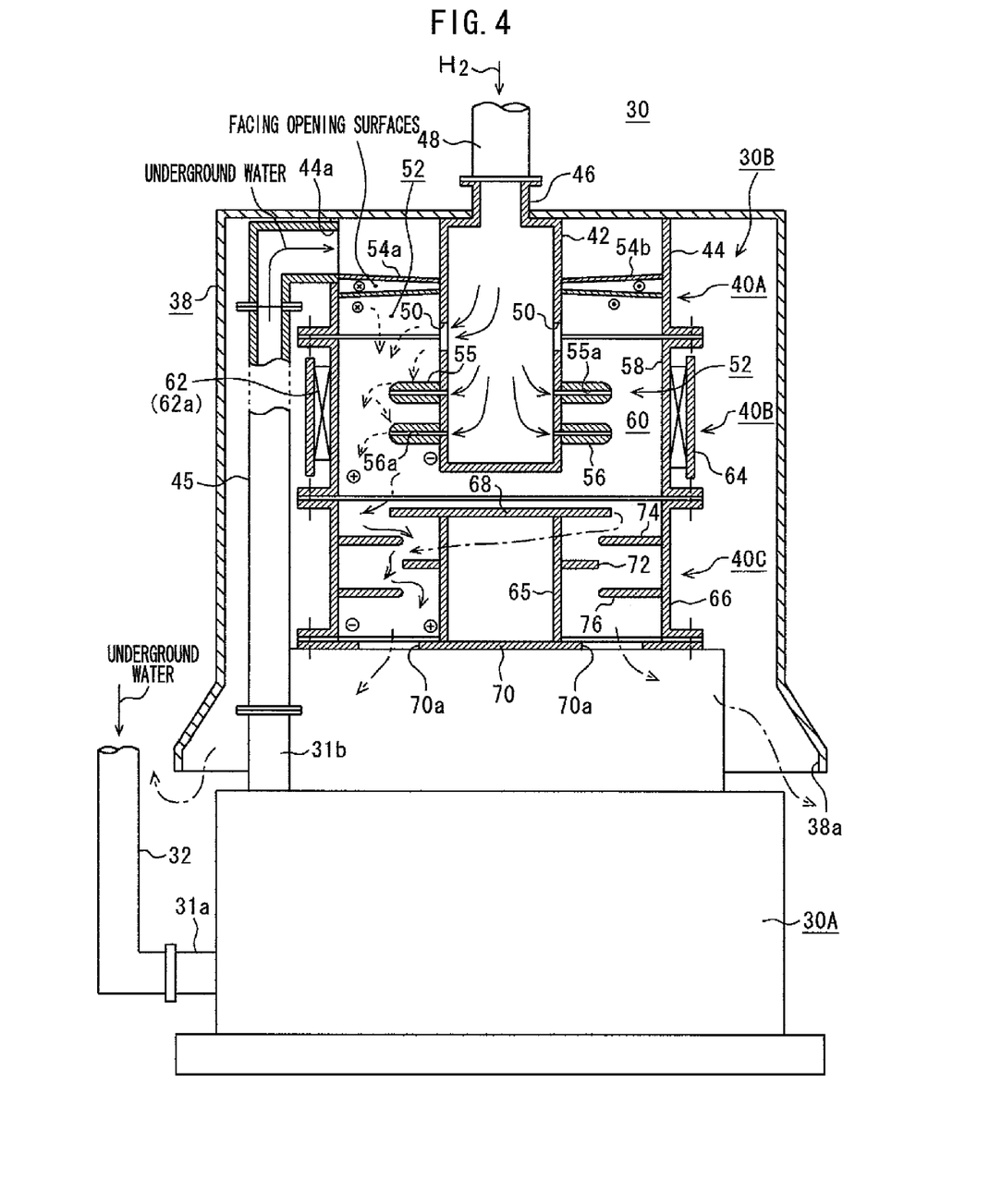
FIG. 4 is a cross-sectional diagram of a main portion for showing an embodiment of an electromagnetic water processing apparatus which constitutes the reduced water producing apparatus according to the present invention.

The following will describe an illustrative embodiment of the electromagnetic water processing apparatus 30 located in the processing tank 102 with reference to FIG. 4 and the subsequent figures.

As shown in FIG. 4, this electromagnetic water processing apparatus 30 has a tubular case 38 using a metal which is difficult to corrode or a resin and the water processing unit 30B provided in the inside of this tubular case 38 is constituted of a vortex flow generating portion 40A for accelerating the flow velocity of the mixed water guided by the transport pump 30A, an electromagnetic portion 40B for discharging hydrogen gas into the accelerated raw water, for applying electrolysis with respect to the discharged hydrogen gas and for orienting the hydrogen ions which have been applied with electrolysis and bubbled, and a gas bubble shearing portion 40C for further shearing the produced gas bubbles to make super-minute grainy gas bubbles. The vortex flow generating portion 40A is positioned at the uppermost portion, the electromagnetic portion 40B is positioned at an intermediate portion and then, the gas bubble shearing portion 40C is positioned at the lowermost portion.

It will be explained in sequence, wherein, first, the vortex flow generating portion 40A has an upper portion internal cylinder 42 and an upper portion external cylinder 44, both of which are molded by metals that are strong against corrosion, the upper portion external cylinder 44 being provided with a relatively large mixed water taking-in port 44a, through which the mixed water pumped by the transport pump 30A via a coupling pipe 45 is water-poured into a water-flowing space portion 52 between the upper portion internal cylinder 42 and the upper portion external cylinder 44.

A taking-in port 46 for hydrogen gas is provided at a top portion of the upper portion internal cylinder 42 and by utilizing a pipe 48 connected thereto, the hydrogen gas is transported. The hydrogen gas is stored in a tank, which is not shown. The taken-in hydrogen gas is discharged into the water-flowing space portion 52 through a plurality of gas inlets 50 provided in the circumferential direction of an approximately intermediate portion of the upper portion internal cylinder 42.

The vortex flow generating portion 40A for turning the mixed water into a vortex flow is provided at the upper portion internal cylinder 42. By turning the mixed water into a vortex flow, mixing degree (mixing efficiency) thereof with the hydrogen gas is improved.

Figure 5:
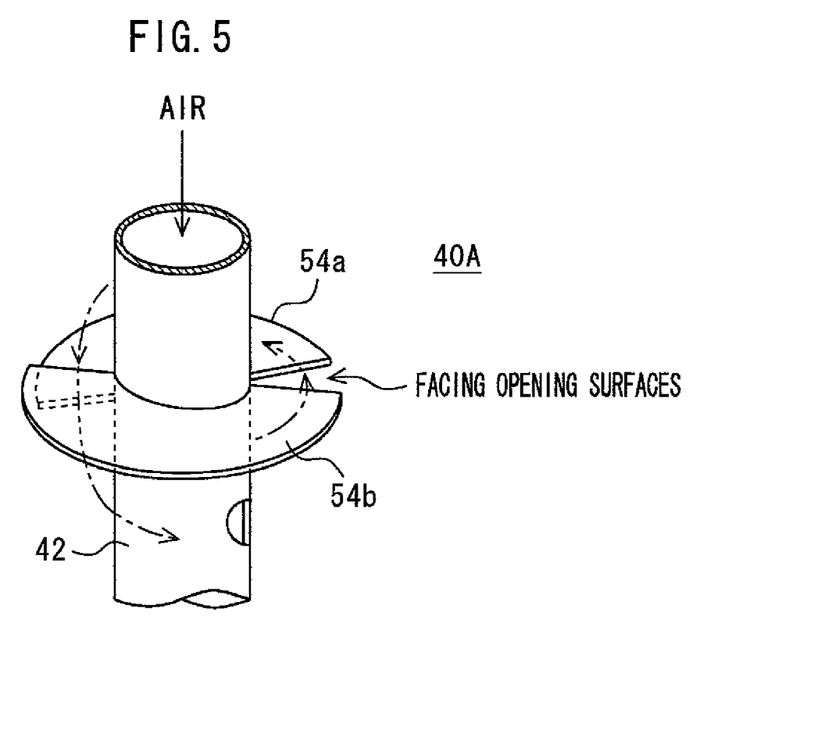
FIG. 5 is a perspective view of a main portion for explaining a vortex flow generating portion.

In the vortex flow generating portion 40A, a pair of pressurization blades 54a, 54b for generating a revolution flow and for carrying out pressurization is mounted and fixed, each of which has a semicircle moon-shape as shown in FIG. 5 and has approximately the same diameter as an internal diameter of the upper portion external cylinder 44, with the blades having predetermined inclination angles on the same circumference. The pair of blades 54a, 54b is mounted with them having an inclined state by predetermined angles, so that a space between the facing opening surfaces of the pressurization blades 54a, 54b can be made narrower. In this manner, the pair of pressurization blades 54a, 54b is mounted with them being inclined and the facing opening surfaces thereof are made narrower, so that the raw water passing through these facing opening surfaces is discharged into the downstream water-flowing space portion 52 while being revolved and accelerated.

Incidentally, since the raw water which passes through the vortex flow generating portion 40A is made to be a revolution flow (vortex flow) and is flown-down while being accelerated as much as an amount corresponding to the ratio between the opening area of the taking-in port 44a and the area of the facing opening surfaces formed by the pair of pressurization blades 54a, 54b, the raw water becomes a high velocity water flow and is fed to the downstream side if selecting the area ratio thereof accordingly.

Plural bar-shaped fins 55, 56 having predetermined lengths are mounted and fixed radially into the water-flowing space portion 52 at predetermined positions on the downside of the upper portion internal cylinder 42 with them forming upper and lower two steps. These bar-shaped fins 55, 56 are provided for sucking in the hydrogen gas transported into the upper portion internal cylinder 42 and for discharging it into the water-flowing space portion 52.

Figure 6:
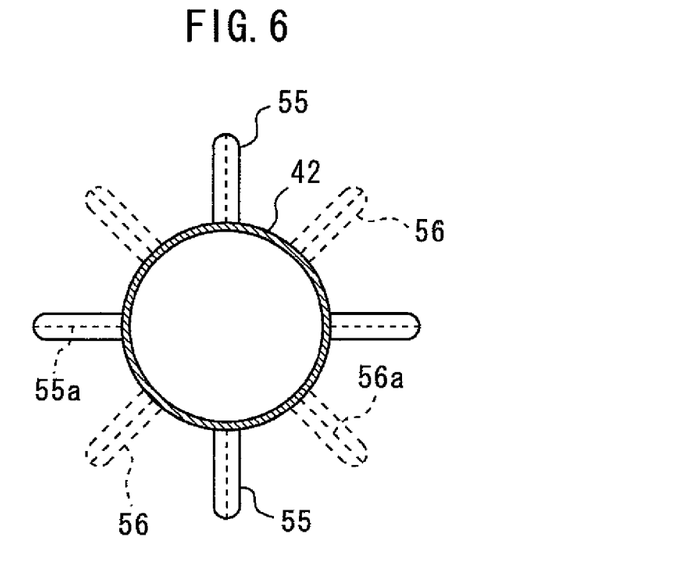
FIG. 6 is an explanatory diagram of a mounting state of bar-shaped fins used in the vortex flow generating portion.

As shown in FIG. 6, with respect to the bar-shaped fins 55 at the upper step, for example, four pieces thereof are fixed on the upper portion internal cylinder 42 approximately by 90° distances. The bar-shaped fins 56 positioned further at the lower step compared with these bar-shaped fins 55 are mounted and fixed with them being deviated by 45° with respect to the bar-shaped fins 55. Further, these bar-shaped fins 55, 56 are respectively provided with air guide openings 55a, 56a at the central portions thereof.

As mentioned above, the hydrogen gas fed into the water-flowing space portion 52 from the gas inlets 50 is mixed with the raw water in the water-flowing space portion 52 and at the same time is bubbled. Owing to a fact that these gas bubbles are broken by colliding against the bar-shaped fins 55, 56 at the upper and lower two steps, the gas bubbles become smaller gradually.

Also, the flow velocity on the tip portion side of the air guide openings 55a, 56a in the bar-shaped fins 55, 56 becomes slower than the flow velocity of the gas bubbles flowing at the periphery surface portion of the bar-shaped fins 55, 56, so that the pressure in the vicinity of the tip portions of the bar-shaped fins 55, 56 becomes negative pressure and the hydrogen gas in the air guide openings 55a, 56a gets sucked into the inside of the water-flowing space portion 52. Accordingly, the gas bubbles further increase. As described above, the bar-shaped fins 55, 56 are provided for making the gas bubbles smaller and increasing the gas bubbles.

With respect to the upper portion internal cylinder 42, the external cylinder arranged on the outside thereof is divided into two pieces of the upper portion external cylinder 44 and the middle portion external cylinder 58 according to this embodiment, and the upper portion external cylinder 44 of them is constituted so as to have a length approximately up to the vicinity of the gas inlets 50. Thus, the middle portion external cylinder 58 coupled to this upper portion external cylinder 44 is selected and used so as to have such a length that can cover the upper portion internal cylinder 42 mounted with the pairs of bar-shaped fins 55, 56.

Then, the electromagnetic portion 40B is constituted of this upper portion internal cylinder 42 and the middle portion external cylinder 58. The electromagnetic portion 40B is constituted of electric field generating means 60 and magnetic field generation means 62. The water molecule and the hydrogen gas are electrolyzed by the electric field generating means 60 and also, orientation is performed on the hydrogen atom and the hydrogen ions (H+, H−), which have been electrolyzed, in cooperation with the electric field generating means 60 and the magnetic field generation means 62.

First, the electric field generating means 60 is constituted of a cylindrical electrode pair constituted by the upper portion internal cylinder 42 and the middle portion external cylinder 58, and an electric voltage (electric field) is formed in the water-flowing space portion 52.

Figure 7:
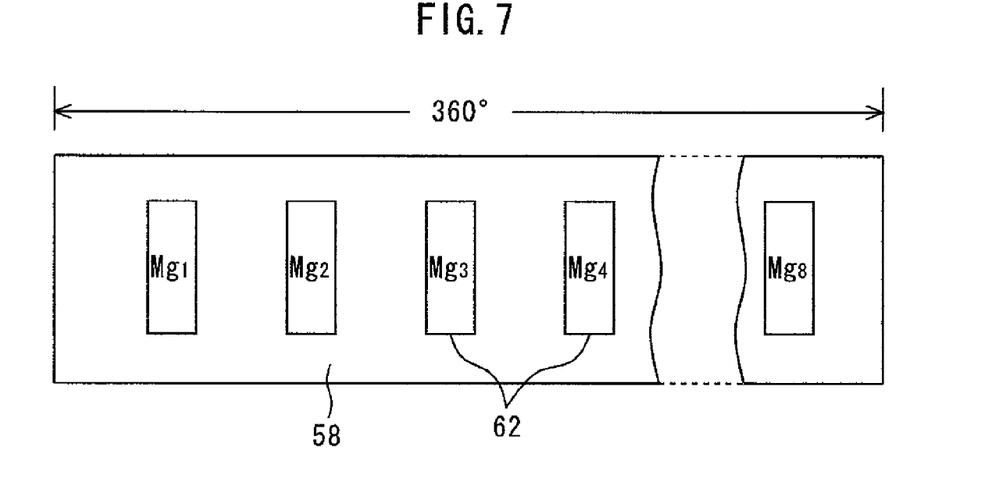
FIG. 7 is a development chart of a central external cylinder for showing a mounting state of magnets.

Pieces of the magnetic field generation means 62 are provided along a periphery surface of the middle portion external cylinder 58. In this embodiment, magnets (permanent magnets, electromagnets or the like) are used as the magnetic field generation means. For this reason, according to this embodiment, eight pieces of bar-shaped permanent magnets 62 as the magnetic field generation means are mounted by predetermined distances, for example, approximately by 45° distances as shown in FIG. 7. Bar-shaped magnets are used in which their magnetic fields on a side (inside) of the middle portion external cylinder 58 are made N-poles and their magnetic fields on the outside thereof are made S-poles. A metal band 64 for fixing the magnets is mounted on the outside of the bar-shaped magnet 62 and this metal band 64 functions also as an electrode for the middle portion external cylinder 58.

The following will describe the gas bubble shearing portion 40C with reference to FIG. 4. This gas bubble shearing portion 40C is constituted of a lower-portion internal cylinder 65 and a lower-portion external cylinder 66, in which anti-corrosive metal material of stainless or the like is also used, the lower-portion internal cylinder 65 has upper and lower disc-like block plates 68, 70 made of metal or made of resin, and a flange 72 forming a disc-like shape is mounted at a portion (on a side of the center upper portion) of the periphery surface thereof. The upper and lower block plates 68, 70 are constituted of metal material, but the flange 72 may be made of any one of metal and resin.

As shown in FIG. 4, while the upper block plate 68 is selected so as to have approximately the same external diameter as the tip diameters of the bar-shaped fins 55, 56, the lower block plate 70 is selected so as to have approximately the same external diameter as an external diameter of the lower-portion external cylinder 66 (actually, diameter until the flange thereof). Water-sending ports 70a forming major-axis or circular shapes are provided at a plurality of places at the position facing the water-flowing space portion 52 within the lower block plate 70.

On the other hand, fins for shearing the gas bubbles (shearing fins) 74, 76 are provided radially on the inside of the lower-portion external cylinder 66, in this embodiment over two steps, with them keeping a predetermined distance therebetween. The relationship among the shearing fins 74, 76, the flange 72, and the upper block plate 68 is shown in FIG. 8.

Figure 8:
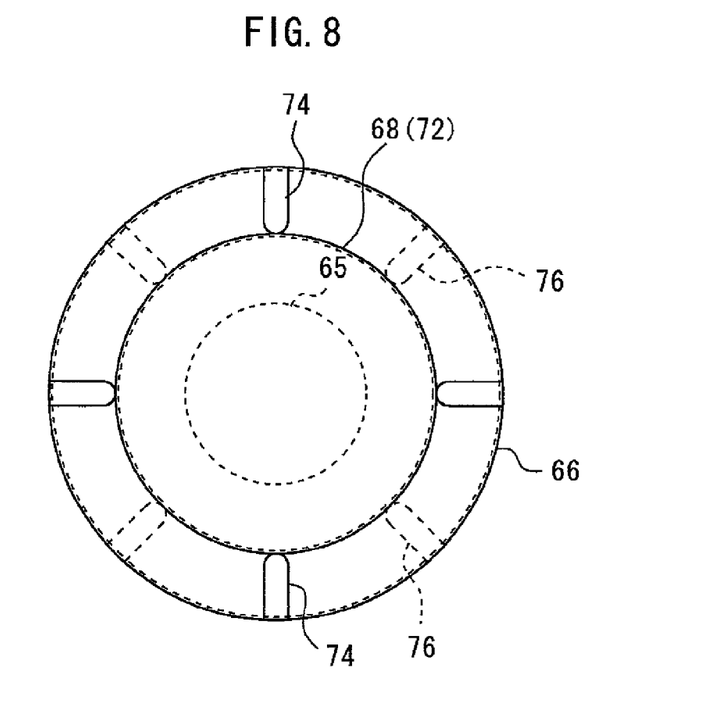
FIG. 8 is a plan view of a main portion of the gas bubble shearing portion for showing an embodiment thereof.

As shown in FIG. 8, when the shearing fins 74 on the upstream side are mounted radially with approximately 90° distances, the shearing fins 76 on the downstream side are mounted radially in a state of being rotated therefrom approximately by 45°. The length thereof is a length which stands for approximately facing the flange 72, but this is shown only as one example.

The plurality of internal cylinders and the external cylinders mentioned above are used for the electrodes. For the plurality of internal cylinders 42, 65 and external cylinders 44, 58 mentioned above, a metal material as mentioned above such as a stainless material, which does not corrode easily, is used for any one thereof.

Figure 9:
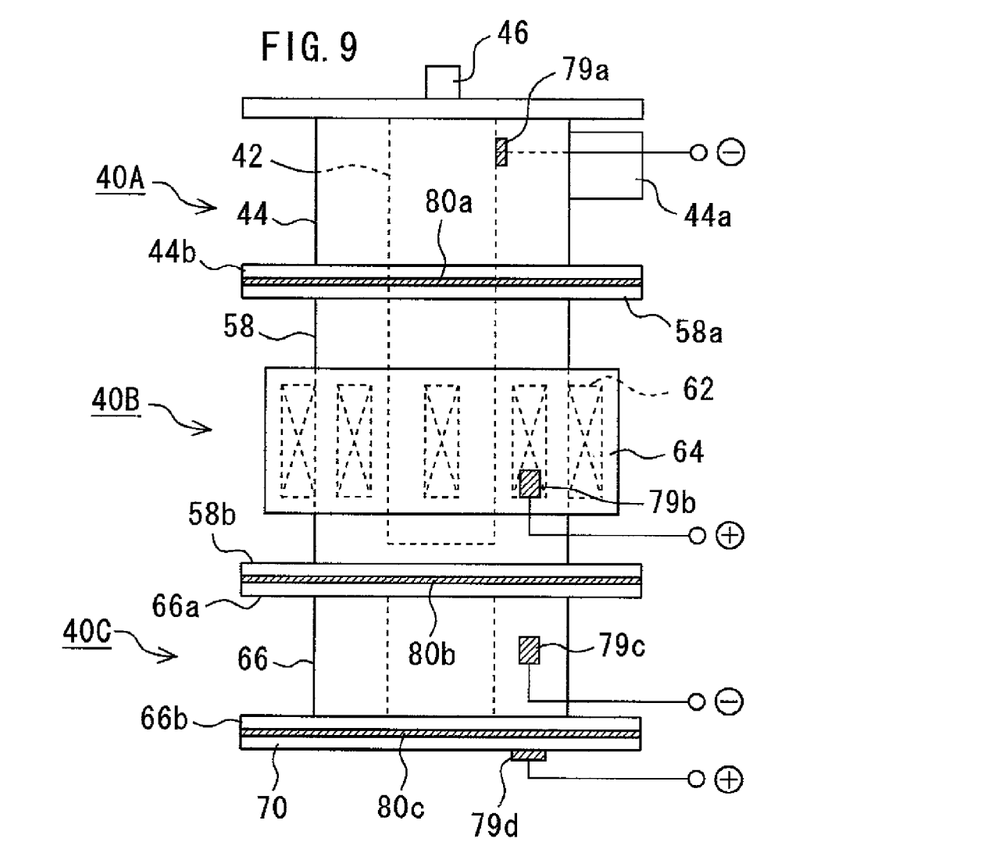
FIG. 9 is a diagram for showing an example of voltage application with respect to electric field generating means.

Then, as shown in FIG. 9, double electrode pairs are constituted by these plural internal cylinders and external cylinders. For example, when the upper portion internal cylinder 42 is a minus electrode, the middle portion external cylinder 58 becomes a plus electrode through the band 64 and also, the lower-portion internal cylinder 65 on the downstream side can obtain conduction depending on the lower block plate 70 and becomes a plus electrode. Then, the lower-portion external cylinder 66 is used as a minus electrode.

Also, in order to form predetermined electric fields by applying predetermined voltages on the respective electrodes, electrodes 79a to 79d are respectively deposited, as shown in FIG. 9, at the corresponding positions. Depending on this configuration, the electric field generating means 60 by the double electrode pairs forming cylindrical shapes is constituted. Each pair of the electrode pairs is applied with currents of around 1 to 3 amperes by voltages of around 10 to 30 volts although they become different depending also on the internal diameter thereof, the electrode structure and the like.

It happens that the vortex flow generating portion 40A, the electromagnetic portion 40B, and the gas bubble shearing portion 40C constituted as described above are configured to be housed in the tubular case 38 as shown in FIG. 4. However, the tubular case 38 has a length not to cover the entire transport pump 30A but has such a degree of length that can cover only the head portion of the transport pump 30A. Further, the lower-portion of this tubular case 38 is made to be a horn aperture portion and the aperture portion thereof is used as a discharge port 38a. Accordingly, even if the transport pump 30A is installed at the bottom portion of the building body as shown in FIG. 3, a reasonable distance can be kept between the discharge port 38a and the bottom surface of the building body.

The external cylinders 44, 58 and 66 mentioned above are respectively provided with coupling flanges 44b, 58a, 58b, 66a, and 66b as shown in FIG. 9 and they are coupled through ring-shaped packing materials 80a to 80c. This allows the three pieces of the external cylinder 44, 58 and 66 to be coupled mutually in a watertight manner while promoting electric insulations mutually.

The raw water taken into the water-flowing space portion 52 of the vortex flow generating portion 40A is pushed out to the downstream side of the water-flowing space portion 52 with it being pressurized by the bar-shaped fins 55, 56. By passing through the bar-shaped fins 55, 56, the raw water becomes a revolution flow and flows down at high velocity. In this embodiment, it becomes a flow velocity of around 20 to 30 m/sec.

The flowing-down raw water is mixed with the hydrogen gas supplied from the gas inlets 50 so that the hydrogen gas bubbles can be produced. These gas bubbles reach the electromagnetic portion 40B with them revolving around the periphery surface of the upper portion internal cylinder 42. In the electromagnetic portion 40B, further, it is further mixed with hydrogen gas supplied from the bar-shaped fins 55, 56 so that the gas bubbles can be further produced. Then, since electric field and magnetic field are applied in this electromagnetic portion 40B, the hydrogen gas is oriented strongly in the direction of the electric field and at the same time, the hydrogen gas is electrolyzed to produce hydrogen ions. The hydrogen ions are produced also depending on the electrode pair 65, 66 on the downstream side, so that large amount of hydrogen ions can be obtained.

Also, since ionized metallic minerals are dissolved in the raw water, the ionized metallic minerals are discharged, together with the hydrogen ions, from the discharge port 38a to the outside of the electromagnetic water processing apparatus (into the water). In a process reaching the gas bubble shearing portion 40C from the electromagnetic portion 40B, each of the ionized metallic minerals is coordinated with H− (hydrides), which are minus ions, on the periphery thereof by making the mineral as a core. When hydrides coordinate with the metallic mineral, the metallic mineral is metal-complex-ionized. The metal-complex-ionized metallic minerals can be stably dissolved in the water for long period of time.

In this manner, by circulating, in this electromagnetic water processing apparatus 30, the production water that includes the complex-ionized metallic minerals which are produced by coordinating the hydrides, it is possible for the water including the complex-ionized metallic minerals to exist voluminously in the production water.

Accordingly, the oxidation-reduction potential EH of the production water including the complex-ionized metallic minerals becomes adequately low and becomes −500 mV or less and also the electron density pe thereof becomes high. The pH at that time becomes around 9, so that it becomes alkaline production water, that is, reduced water.

The following will describe relationship between the oxidation-reduction potential and processing time. First, the raw water is supplied in the processing tank 102 through the transport pipe 104 until the reference water-surface L. Underground water obtained by disinfecting underground water by chlorine was used for the raw water. The oxidation-reduction potential EH of the underground water is around 100 mV. Tap water may be used instead of underground water. The oxidation-reduction potential EH of the tap water is around 300 mV.

Figure 10:
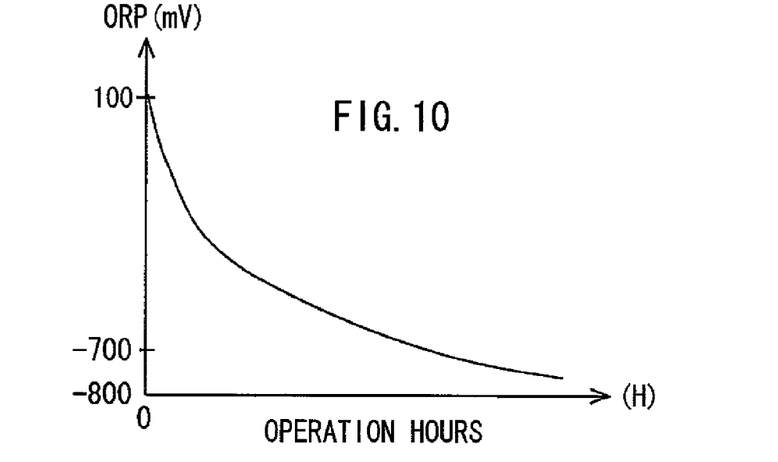
FIG. 10 is a characteristic diagram for showing an oxidation-reduction potential while the electromagnetic water processing apparatus operates.

When the raw water is filled until the reference water-surface L, the supply of the raw water is stopped. The electromagnetic water processing apparatus 30 is operated in that state. FIG. 10 is a characteristic curve for showing how much the oxidation-reduction potential (ORP) EH changed with respect to operation time of this electromagnetic water processing apparatus 30. It became clear that the oxidation-reduction potential EH in the production water lowers along the operation time and when the EH becomes a certain value (around −750 mV), it hardly changes thereafter.

Table 1 shows actual measurement values. The values are values when the electromagnetic water processing apparatus 30 was operated continuously for two hours and was stopped after that. The measurement condition is shown in table 2.

TABLE 1

| elapsed time | ORP Value (mv) | | |
|---|---|---|---|
| (minutes) | IWC-5 | ORP TESTR 10 | Remarks |
| 0.00 | 295 | 503 | Driving |
| 0.15 | 282 | −21 | Driving |
| 0.30 | −578 | −414 | Driving |
| 0.45 | −595 | −465 | Driving |
| 1.00 | | | Driving |
| 1.15 | | | Driving |
| 1.30 | −615 | −567 | Driving |
| 1.45 | −620 | −565 | Driving |
| 2.00 | −621 | −580 | Driving |
| 2.15 | | | Driving Stopped |
| 2.30 | | | Driving Stopped |

TABLE 1-continued

| elapsed time (minutes) | ORP Value (mv) IWC-5 | ORP TESTR 10 | Remarks |
|---|---|---|---|
| 2.45 | | | Driving Stopped |
| 3.00 | | | Driving Stopped |
| 3.15 | | | Driving Stopped |
| 3.30 | | | Driving Stopped |
| 3.45 | | | Driving Stopped |
| 4.00 | | | Driving Stopped |
| 4.15 | | | Driving Stopped |
| 4.30 | | | Driving Stopped |
| 4.45 | | | Driving Stopped |
| 16.00 | −600 | −514 | Driving Stopped |

TABLE 2

| Measurement Condition | |
|---|---|
| Water Temperature | 19.5° C. |
| Current | 2.5 A |
| Hydrogen Gas | 2 L/Min |
| Volume of Water | 0.8 ton |

The measurement condition when the actual measurement values of the table 1 are obtained is such that the water temperature is 19.5□, the volume of water in the processing tank 102 is 0.8 ton, and the operation current of the electromagnetic water processing apparatus 30 (application current to the electromagnetic portion 40B) is 2.5 A (amperes). Hydrogen gas of around 2 litters per one minute is supplied.

The oxidation-reduction potential EH of the raw water before operating the electromagnetic water processing apparatus 30 was 295 mV. When the electromagnetic water processing apparatus 30 is operated under this condition, it was confirmed that the oxidation-reduction potential EH thereof lowers until −621 mV after two hours have elapsed. When the oxidation-reduction potential EH became −621 mV, the operation of the electromagnetic water processing apparatus 30 was deactivated. Then, the produced reduced water was transferred to the storage tank 140 and stored therein.

Figure 11:
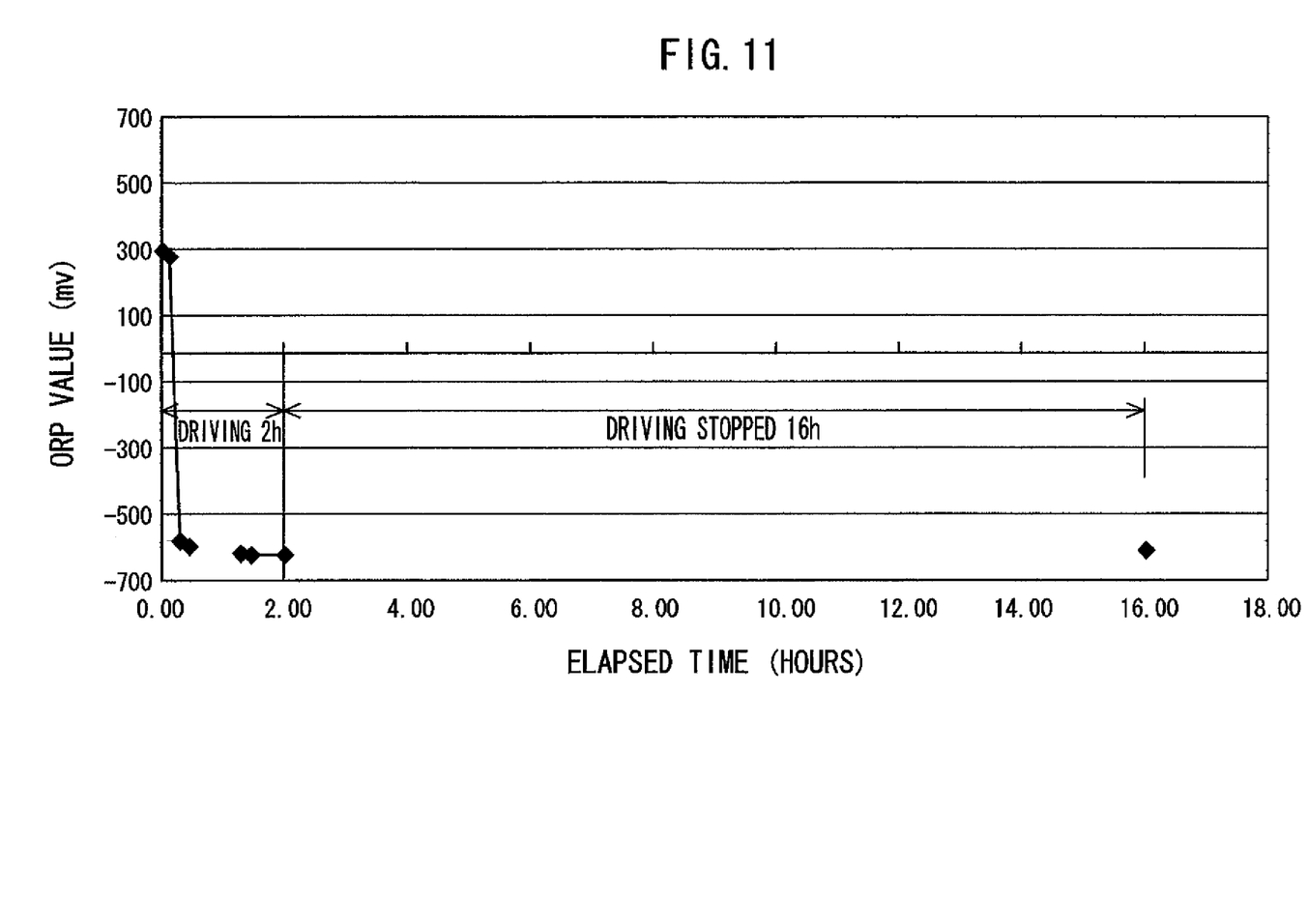
FIG. 11 is a diagram when actual measurement values in table 1 are graphed.

When the reduced water in the storage tank 140 was measured after 14 hours had elapsed from the time when the operation of the electromagnetic water processing apparatus 30 was stopped, it was found that the oxidation-reduction potential EH at that time became −600 mV. The reduced water is stored in the storage tank 140 made of metal, so that it happens that the reduced water is stored therein in any electrically shielded state from the outside. Therefore, the electron density pe does not lower so much. As a result thereof, it was possible to suppress the rising of the oxidation-reduction potential EH. When graphing the actual measurement values in table 1, it will become such as shown in FIG. 11.

Figure 12:
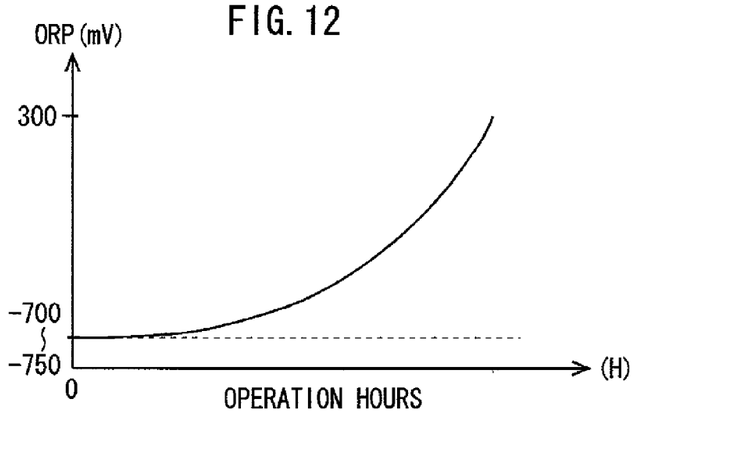
FIG. 12 is a characteristic diagram for showing an oxidation-reduction potential after the electromagnetic water processing apparatus has stopped.

It should be noted that when the storage tank 140 is not made of metal, it becomes not possible to shield the reduced water electrically and at the same time, it becomes easy for the oxygen in the air and the hydride in the reduced water to be combined each other, so that it was comprehended that the oxidation-reduction potential EH roses along with the elapse of time as shown by a solid line in FIG. 12 and returned before long to a value on the occasion of the raw water. A curve drawn by a dotted line shows an example in which the reduced water is stored by using the storage tank 140 made of metal.

Figure 13:
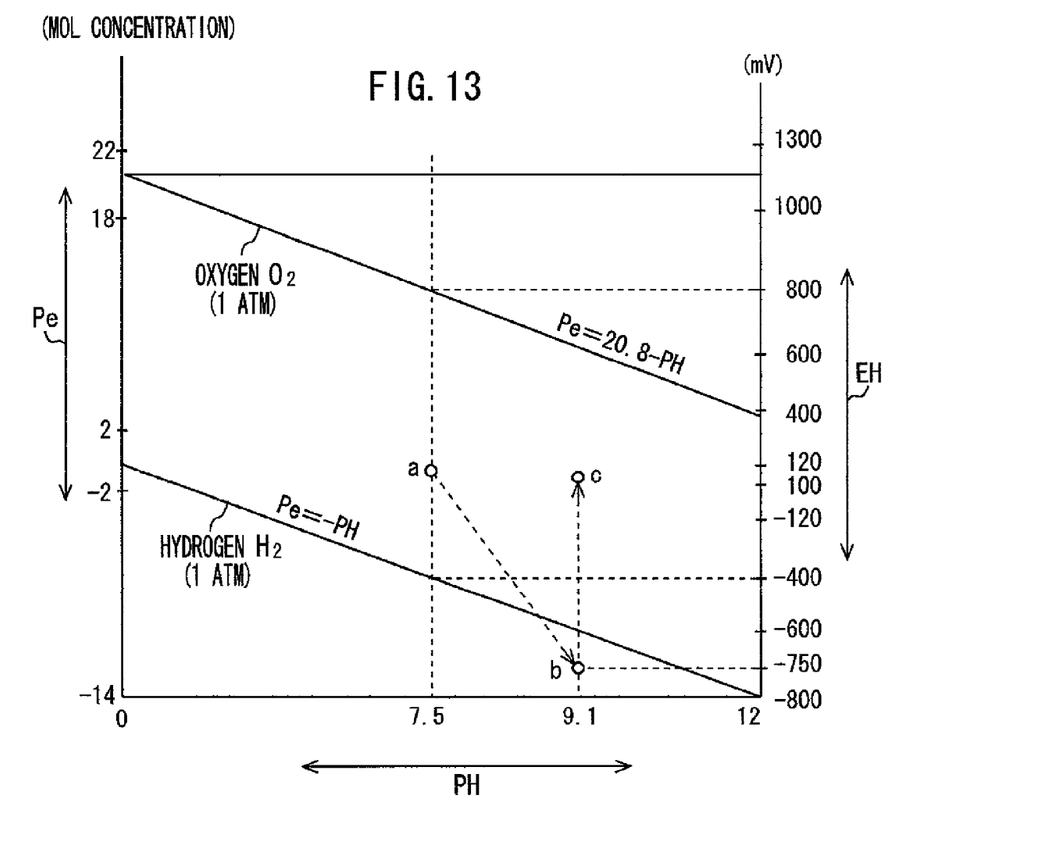
FIG. 13 is a graph for showing a relationship between the oxidation-reduction potential and electron density with respect to acidity at that time.

Also, when operating the electromagnetic water processing apparatus 30, the oxidation-reduction potential EH lowers gradually, so that also the degree of acidity of the production water is displaced from neutral to alkaline. One example thereof is shown in FIG. 13. In FIG. 13, there are shown, when raw water having an initial oxidation-reduction potential EH of around 100 mV ("a" point) is used, the value ("b" point) of the oxidation-reduction potential EH after two hours have elapsed and the degree of acidity at that time. It is comprehended so as to become alkaline production water. The oxidation-reduction potential EH rises along with the elapse of time and finally becomes the initial value ("c" point).

Figure 14:
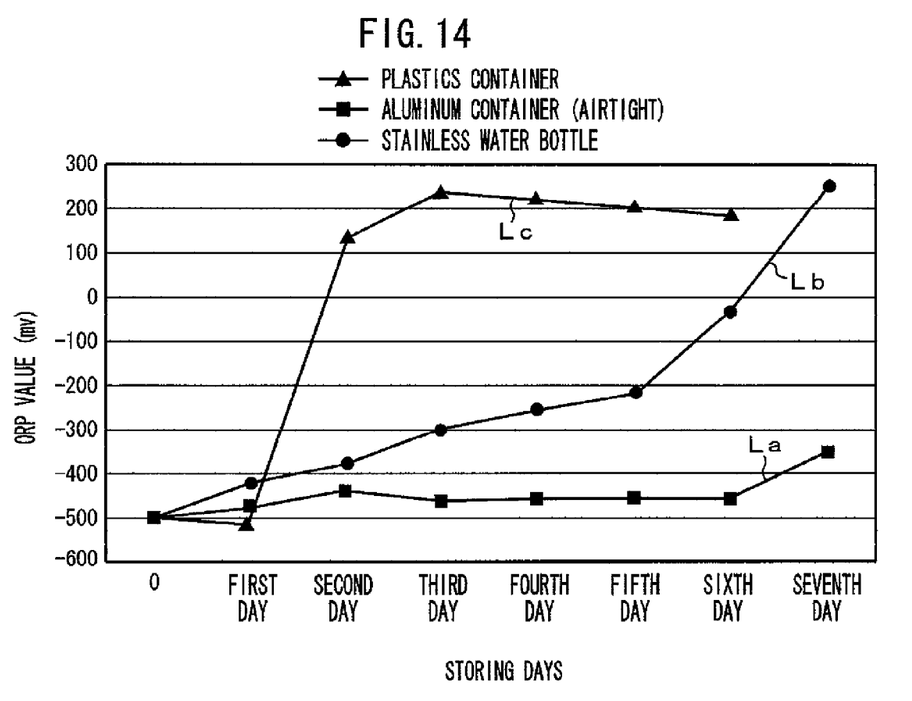
FIG. 14 is a characteristic diagram for showing a relationship between materials of containers and the oxidation-reduction potential.

FIG. 14 is a characteristic diagram for showing materials of the container for storing the produced reduced water and variations of the oxidation-reduction potentials. Curve La shows elapsed time and change of the oxidation-reduction potential when storing the reduced water in a container made of aluminum. Curve Lb shows displacement when storing the water in a water bottle made of stainless. Then, curve Lc shows a case in which the storing is carried out in a container made of plastic.

As being clear from FIG. 14, the rising of the oxidation-reduction potential is the least when using the aluminum container in which it is easy to shield the outside light and the unpaired electrons most and the potential does not vary so much at least until about six days after the storage. The oxidation-reduction potential EH rises gradually after about the seventh day.

When storing it in a wide-mouthed stainless container (water bottle), airtightness characteristic with respect to the air is bad and it is not possible to shield the unpaired electrons completely and therefore, it happens that the oxidation-reduction potential EH rises along with the elapse of days. Then, it was confirmed that the potential will return nearly to the original oxidation-reduction potential EH on about the seventh day. Also, in case of using the container made of plastic, it was confirmed that the oxidation-reduction potential EH roses rapidly after about one day or two days after the storage and the oxidation-reduction potential EH became near that of the raw water.

Consequently, a container made of metal is preferable for storing the reduced water. If it is a metal container, it is comprehended that even if the water is shipped from a factory, it will function as the reduced water around one week.

Figure 15:
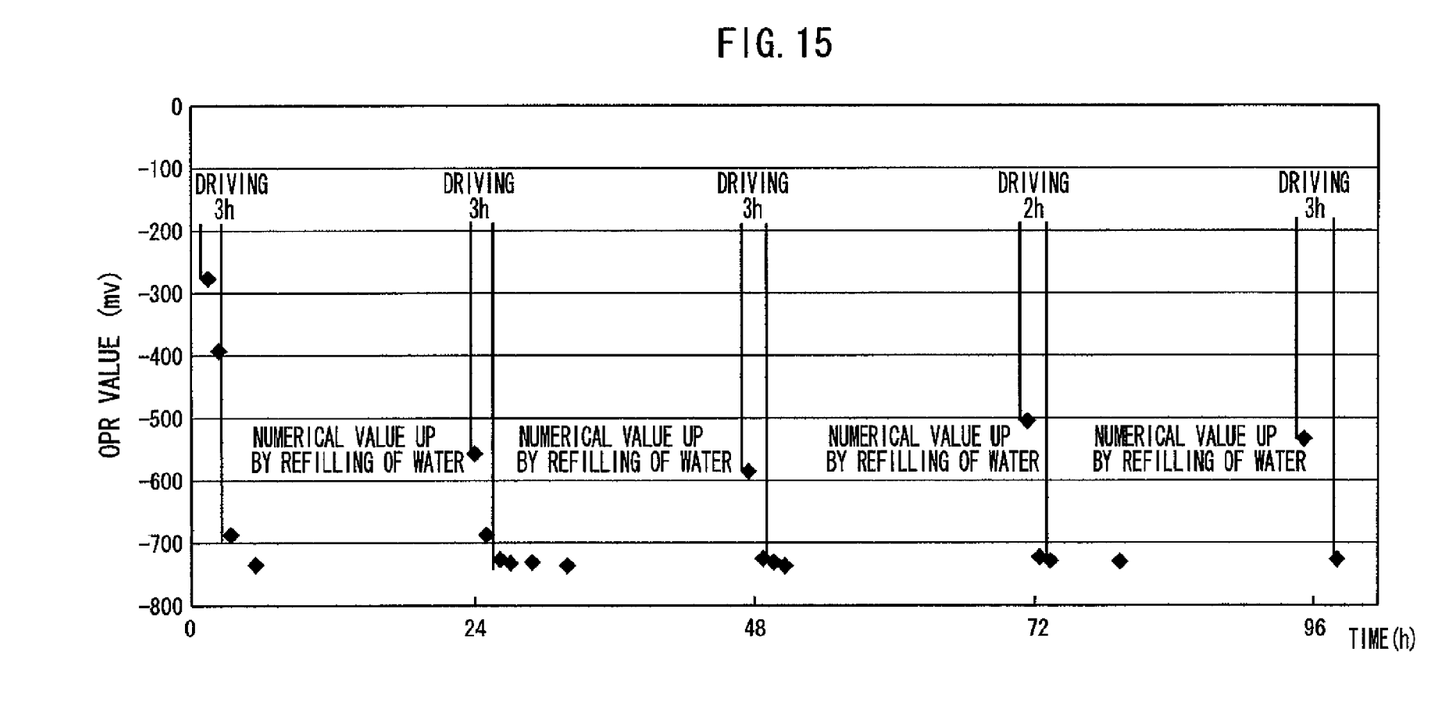
FIG. 15 is a characteristic diagram for showing a relationship between raw water resupply and the oxidation-reduction potential.

FIG. 15 is a characteristic diagram for showing a relationship between raw water resupply to the processing tank 102 and the oxidation-reduction potential EH. The embodiment of FIG. 15 is an embodiment when it was continued for four days in succession that the oxidation-reduction potential EH was held to be around −700 to −750 mV, which was an original target value by operating the electromagnetic water processing apparatus 30 for three hours, and then the raw water was resupplied after 22 to 23 hours had elapsed from the operation thereof. The amount of resupply is the difference which was utilized as the reduced water.

By resupplying the raw water, the oxidation-reduction potential EH at that time rises until −500 to −550 mv, but it is possible, by operating the electromagnetic water processing apparatus 30 again, to lower the oxidation-reduction potential EH until the original target value. Consequently, if resupplying the volume of water as much as being used, it is comprehended that reduced water having the oxidation-reduction potential EH of the target value (−500 mV or less) can be always produced after the stop of the operation of the electromagnetic water processing apparatus 30.

The invention claimed is:

1. A reduced water producing apparatus for producing reduced water from raw water including a metallic mineral, the apparatus comprising:

a processing tank which contains the raw water including the metallic mineral, wherein the processing tank has a processing zone, an inlet zone that communicates with the processing zone via an inlet weir, and an outlet zone that communicates with the processing zone via an outlet weir;

an electromagnetic water processing apparatus which produces the reduced water from the raw water, the electromagnetic water processing apparatus being located in the processing zone of the processing tank and being at least partially immersed in the raw water contained in the processing tank, the electromagnetic water processing apparatus comprising a transport pump having a first water inlet for receiving raw water from the processing tank and also having a water outlet, a water processing unit having an a gas inlet for supply of hydrogen gas to the water processing unit, a second water inlet connected to the water outlet of the transport pump, and an outlet for discharging water into the processing tank;

a circulation pump which is in fluid communication with the processing tank and circulates the raw water through the electromagnetic water processing apparatus in the processing tank, the circulation pump being connected to a conduit for delivering water from the outlet zone to the inlet zone without passing through the processing zone; and a storage tank which stores the produced reduced water therein, the storage tank being connected to the processing tank, wherein the water processing unit is provided with an electromagnetic portion through which the raw water and the hydrogen gas pass, wherein the electromagnetic portion processes the hydrogen gas to make gas bubbles and to ionize the hydrogen gas, and wherein the reduced water is discharged from the electromagnetic water processing apparatus into the processing zone on the processing tank.

2. The reduced water producing apparatus according to claim 1, characterized in that oxidation-reduction potential of the reduced water is −500 mV or less.

3. The reduced water producing apparatus according to claim 1, characterized in that a gas bubble shearing portion for miniaturizing the gas bubble of said hydrogen ion is provided on the downstream side of said electromagnetic unit, a fin that disturbs the passing water flow is provided between a lower-portion internal cylinder and a lower-portion external cylinder which constitute said gas bubble shearing portion, and said gas bubble is miniaturized by repeatedly hitting the water flow with respect to said fin.

4. A method of producing reduced water, comprising:

providing an electromagnetic water processing apparatus, the electromagnetic water processing apparatus being at least partially immersed in a body of raw water including a metallic mineral, wherein the electromagnetic water processing apparatus is located in a processing zone of a processing tank, the processing tank also having an inlet zone that communicates with the processing zone via an inlet weir, and an outlet zone that communicates with the processing zone via an outlet weir, and the electromagnetic water processing apparatus comprises a transport pump having a first water inlet for receiving raw water from the body of raw water and also having a water outlet, a water processing unit having a gas inlet for supply of hydrogen gas to the water processing unit, a second water inlet connected to the water outlet of the transport pump, and an outlet for discharging water into the body of raw water, employing the transport pump to create a flow of the raw water through the water processing unit, employing a circulation pump to create a circulating flow of the raw water, wherein the circulation pump is connected to a conduit for delivering water from the outlet zone to the inlet zone without passing through the processing zone, supplying hydrogen gas to the gas inlet of the water processing unit and forming bubbles of hydrogen gas in the raw water flowing through the water processing unit, and ionizing the hydrogen gas to produce hydrogen ion, discharging reduced water from the electromagnetic water processing apparatus into the processing zone of the processing tank, and storing the produced reduced water in a storage tank that is in communication with the body of raw water.

5. The method of producing reduced water according to claim 4, wherein oxidation-reduction potential of the reduced water is −500 mV or less.

6. The method of producing reduced water according to claim 4, comprising introducing hydrogen gas into the raw water to form bubbles of hydrogen gas in the raw water, and miniaturizing the bubbles of hydrogen gas by shearing.

7. The method of producing reduced water according to claim 6, comprising shearing the bubbles of hydrogen gas by rotating a fin through the water, whereby the fin disturbs the water flow.

8. The reduced water producing apparatus according to claim 1, wherein the outlet weir comprises first and second partitions provided between the processing zone and the outlet zone.

9. The reduced water producing apparatus according to claim 8, wherein the first partition provides an underflow weir.

10. The reduced water producing apparatus according to claim 1, wherein the processing zone communicates with the outlet zone of the processing tank via an underflow weir, whereby water in a lower region of the processing zone flows to the outlet zone.

11. The reduced water producing apparatus according to claim 1, wherein the apparatus comprises a second conduit that connects the inlet zone of the processing tank to the first water inlet of the transport pump, the second conduit including a return passage in communication with the processing zone whereby water from the outlet of the water processing unit is recirculated to the first water inlet of the transport pump.

* * * * *